United States Patent [19]

Nagashima

[11] Patent Number: 4,770,039
[45] Date of Patent: Sep. 13, 1988

[54] DEVICE FOR INDICATING LEVEL OF LIQUID CONTENTS REMAINING IN TANK

[75] Inventor: Akira Nagashima, Kawasaki, Japan

[73] Assignee: Kioritz Corporation, Tokyo, Japan

[21] Appl. No.: 41,731

[22] Filed: Apr. 22, 1987

[30] Foreign Application Priority Data

Apr. 24, 1986 [JP] Japan .................. 61-62502[U]

[51] Int. Cl.$^4$ .................................. G01F 23/02
[52] U.S. Cl. .................................. 73/323; 73/334; 83/788; 116/227
[58] Field of Search .......... 73/323, 334; 220/82 A; 116/227, 304

[56] References Cited

U.S. PATENT DOCUMENTS

| | | | |
|---|---|---|---|
| 2,554,557 | 5/1951 | Brown et al. .................. | 73/327 |
| 4,133,287 | 1/1979 | Downs .................. | 116/227 |
| 4,141,311 | 2/1979 | Taylor, Jr. .................. | 116/227 |
| 4,376,490 | 3/1983 | Mizusaki .................. | 220/82 R |
| 4,603,443 | 8/1986 | Stewart .................. | 73/334 X |

Primary Examiner—Daniel M. Yasich
Attorney, Agent, or Firm—Browdy and Neimark

[57] ABSTRACT

A device for indicating the level of liquid contents remaining in a tank which has a viewing portion through which the side of a synthetic resin tank is exposed. The viewing portion is formed around a cap and in the vicinity of an opening of the tank which can be seen through and which is held by a tank holding member, such that the opening of the tank has a dimension which is larger than that of the cap so that the level of the fuel can be viewed through the annular viewing portion formed thereby.

2 Claims, 2 Drawing Sheets

DEVICE FOR INDICATING LEVEL OF LIQUID CONTENTS REMAINING IN TANK

BACKGROUND OF THE INVENTION

1. Field of the Invention

The present invention relates to a device for indicating the level of liquid contents remaining in a tank suitable for use in, for example, a portable power working machine or the like.

2. Description of the Prior Art

In conventional portable power working machines such as chain saws, a cover that covers the side of a fuel tank can be removed only after the fuel tank cap has been removed. Further, generally such machines do not have fuel gauges suitable for indicating the level of fuel remaining in the fuel tank. Thus it is not easy to visually check the fuel.

SUMMARY OF THE INVENTION

Accordingly, it is an object of the present invention to provide a device for indicating the level of liquid contents remaining in a tank suitable for use in a portable power working machine which is capable of overcoming the above noted disadvantages of the known chain saw without the use of an expensive special device, and which is both simple and convenient.

To this end, the present invention provides a device for indicating the level of liquid contents remaining in a tank, comprising: a body which is externally open at one side; a side cover that covers the open side of the body; a synthetic resin tank accommodated in the body and having an opening on the side thereof that faces the open side of the body, the liquid contents of the tank being poured through the opening and being visible through the wall of the tank; a cap for closing the opening of the tank; a tank holding member formed integrally with the side cover in such a manner that it abuts against the side of the tank; and an opening formed in the tank holding member and having a dimension which is larger than that of the cap such as to form a viewing portion around the cap through which the side of the tank can be seen.

In consequence, it is not necessary according to the present invention to remove the cap of the tank when removing the side cover from the body at the time of maintenance/inspection. Further, the viewing portion provided on the side of the tank makes the contents thereof visible, and the level of the contents remaining in the tank can therefore be easily checked. In other words, the side cover can be mounted on and removed from the body without removal of the cap of the tank, thereby facilitating maintenance/inspection work. Further, the indicating device which shows the level of the contents remaining in the tank may be constructed by utilizing the portion of the side cover and the cap. As a result, no special parts or devices are necessary to provide a level indicating device, and the resultant level indicating device is simple, easy to manufacture, and is not subject to failure.

DESCRIPTION OF THE PREFERRED EMBODIMENT

Figure 1:
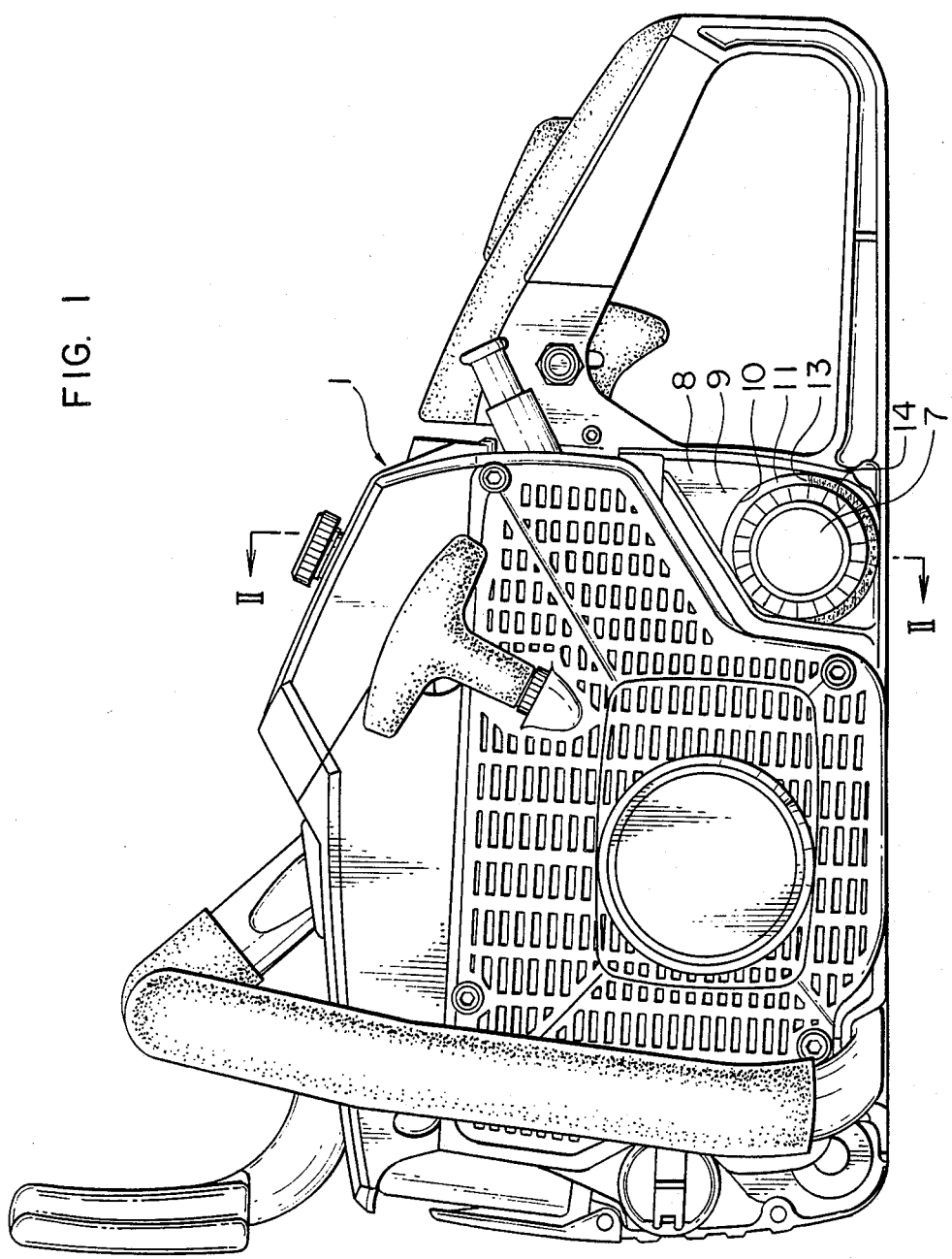
FIG. 1 is a side view of a chain saw incorporating an embodiment of the present invention.
Figure 2:
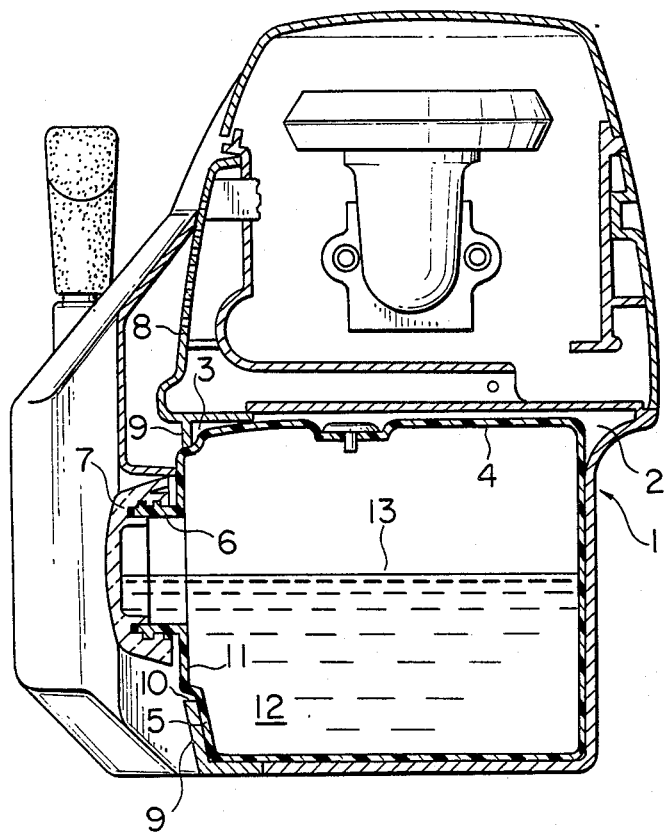
FIG. 2 is a vertical cross-section taken along the line II—II as seen in the direction of the arrows shown in FIG. 1.

An embodiment of the present invention will be hereinunder described by referring to the accompanying drawings.

In this embodiment, a device for indicating the level of liquid contents remaining in a tank of this invention is one for a fuel tank of a chain saw. A body 1 defines a fuel tank chamber 2 in the lower portion thereof. The fuel tank chamber 2 has an outwardly facing opening 3 at one side thereof. A fuel tank 4 is accommodated in the fuel tank chamber 2 by being inserted therein through the opening 3. The fuel tank 4 is formed of, for example, a translucent white synthetic resin by a blow molding process, and has a relatively small wall thickness. The fuel tank 4 is translucent so that the contents thereof (gasoline) can be seen from outside. It has an opening 6 at the side 5 thereof that faces the opening 3 of the fuel tank chamber 2, and the liquid contents are poured into the tank 4 through this opening 6. The opening 6 is closed by means of an opaque circular cap 7 threadedly engaged therewith.

The opening 3 of the fuel tank chamber 2 of the body 1 is covered with a cooling fan cover 8. The cooling fan cover 8 also serves as a side cover, and has an opaque fuel tank holding member 9 integrally formed therewith in such a manner that it abuts against the side 5 of the fuel tank 4 and thereby prevents the fuel tank 4 from being removed from the fuel tank chamber 2. The fuel tank holding member 9 has a circular opening 10 formed coaxially with the opening 6 of the fuel tank 4. The diameter of the circular opening 10 is made larger than that of the cap 7, so that an annular viewing portion 11 is formed between the periphery of the circular opening 10 and the outer periphery of the cap 7, through which a ring-like portion of the side 5 of the fuel tank 4 is made visible. A level 13 of a fuel 12 contained in the fuel tank 4 is revealed at this annular viewing portion 11, whereby an operator can visually check the level of the fuel which remains in the fuel tank 4.

The periphery of the surface of the cap 7 is provided with radially extending graduation lines which can assist when checking the level of the fuel 12 remaining in the fuel tank 4. The graduation lines 14 indicate the level 13 of the fuel 12 which is visible through the annular viewing portion 11, and thereby facilitate checking of the level of the fuel 12.

The tank holding member, tank, and cap may have a suitable color so as to make it easy for an operator to distinguish liquid contents of the tank quickly.

What is claimed is:

1. A device for indicating the level of liquid contents remaining in a tank comprising:

a body which is externally open at one side;

a side cover for covering said open side of said body;

a translucent synthetic resin tank accommodated in said body and having a first opening on the side thereof that faces said open side of said body, the liquid contents of said tank being poured through said opening and being visible through the side of said tank;

a cap for closing said opening of said tank;

a tank holding member integrally formed with said side cover in such a manner that it abuts against said side of said tank; and a second opening formed in said tank holding member and having a diameter which is larger than that of said cap such as to define a viewing portion around said cap through which said side of said tank is exposed through which the level of liquid contents remaining in the tank can be viewed.

2. A device for indicating the level of liquid contents remaining in a tank according to claim 1, wherein the surface of said cap is provided with a scale which serves as a standard for checking the level of liquid remaining in said tank, said scale corresponding to said side opening of said tank which defines said viewing portion.

* * * * *